United States Patent
Dai et al.

(10) Patent No.: US 10,004,013 B2
(45) Date of Patent: Jun. 19, 2018

(54) BASE STATION, TERMINAL, AND HANDOVER METHOD

(71) Applicant: HUAWEI TECHNOLOGIES CO., LTD., Shenzhen, Guangdong (CN)

(72) Inventors: Mingzeng Dai, Shanghai (CN); Qinghai Zeng, Shanghai (CN); Jian Zhang, Shanghai (CN); Hongping Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 32 days.

(21) Appl. No.: 15/255,930

(22) Filed: Sep. 2, 2016

(65) Prior Publication Data

US 2016/0373979 A1  Dec. 22, 2016

Related U.S. Application Data

(63) Continuation of application No. PCT/CN2014/073001, filed on Mar. 6, 2014.

(51) Int. Cl.
*H04W 36/00* (2009.01)
*H04W 36/06* (2009.01)
(Continued)

(52) U.S. Cl.
CPC .......... *H04W 36/06* (2013.01); *H04W 76/25* (2018.02); *H04W 28/14* (2013.01); *H04W 74/0833* (2013.01)

(58) Field of Classification Search
CPC ... H04W 36/06; H04W 76/045; H04W 28/14; H04W 74/0833
See application file for complete search history.

(56) References Cited

U.S. PATENT DOCUMENTS

| | | |
|---|---|---|
| 2004/0082337 A1 | 4/2004 | Lacroix et al. |
| 2010/0124201 A1 | 5/2010 | Griot et al. |

(Continued)

FOREIGN PATENT DOCUMENTS

| | | |
|---|---|---|
| CN | 1390069 | 1/2003 |
| CN | 1505359 | 6/2004 |

(Continued)

OTHER PUBLICATIONS

Chinese Office Action dated Jun. 19, 2017 in corresponding Chinese Patent Application No. 201480001029.X.
(Continued)

*Primary Examiner* — Barry W Taylor
(74) *Attorney, Agent, or Firm* — Staas & Halsey LLP

(57) ABSTRACT

The present invention discloses a base station, a terminal, and a handover method. The handover method includes: sending an indication message by a base station, wherein the indication message is used to instruct the terminal to further establish a connection to the base station through a second channel in a case in which the terminal maintains a connection to the base station through a first channel; receiving an access message by the base station through the first channel, wherein the access message indicates that the terminal has established the connection to the base station through the second channel; sending a handover command by the base station, wherein the handover command instructs the terminal to switch the communication with the base station from the first channel to the second channel; and switching, by the base station, communication with the terminal from the first channel to the second channel.

13 Claims, 9 Drawing Sheets

(51) Int. Cl.
   *H04W 28/14* (2009.01)
   *H04W 74/08* (2009.01)

(56) References Cited

U.S. PATENT DOCUMENTS

| | | | |
|---|---|---|---|
| 2011/0170519 | A1 | 7/2011 | Zhang et al. |
| 2011/0292911 | A1 | 12/2011 | Uemura et al. |
| 2013/0148603 | A1 | 6/2013 | Lee et al. |
| 2014/0328325 | A1* | 11/2014 | Bai ............... H04W 74/008 370/331 |
| 2015/0156636 | A1* | 6/2015 | Tabet ............. H04W 16/14 370/329 |
| 2015/0350962 | A1* | 12/2015 | Futaki ............ H04B 7/024 370/331 |
| 2017/0303283 | A1* | 10/2017 | Ng ............... H04W 72/0453 |

FOREIGN PATENT DOCUMENTS

| | | |
|---|---|---|
| CN | 101222464 A | 7/2008 |
| CN | 101668319 A | 3/2010 |
| CN | 102238625 A | 11/2011 |
| CN | 102291801 A | 12/2011 |
| CN | 103188711 | 7/2013 |
| EP | 2326124 | 5/2011 |
| EP | 2793526 | 10/2014 |
| JP | 201239467 | 2/2012 |
| JP | 2013500672 | 1/2013 |
| JP | 2013255233 | 12/2013 |
| WO | WO2010082521 | 7/2010 |
| WO | 2011/129574 A2 | 10/2011 |
| WO | WO2012118740 | 9/2012 |
| WO | WO2013049136 | 4/2013 |
| WO | WO2013086874 | 6/2013 |

OTHER PUBLICATIONS

International Search Report, dated Nov. 4, 2014, in International Application No. PCT/CN2014/073001 (4 pp.)
Extended European Search Report, dated Nov. 3, 2016, in European Application No. 14885023.3 (12 pp.).
*RLC, MAC and HARQ context transfer for intra-eNB handover*, 3GPP TSG-RAN#56 WG 2 LTE, R2-063328, Riga, Latvia; Oct. 6-Nov. 10, 2006, pp. 1-3.
*IEEE Standard for Information technology—Telecommunications and information exchange between systems Local and metropolitan area networks—Specific requirements, Part 11: Wireless LAN Medium Access Control (MAC) and Physical Layer (PHY) Specifications*, IEEE Std 802.11-2012, pp. 1-2695.
*Motivation of the New SI Proposal: Study on Licensed-Assisted Access using LTE*, 3GPP TSG RAN Meeting #63, Fukuoka, Japan, Mar. 3-6, 2014 RP-140214, pp. 1-9.
International Search Report, dated Nov. 4, 2014, in corresponding International Application No. PCT/CN2014/073001 (4 pp.).
Office Action, dated Dec. 12, 2017, in Japanese Application No. 2016555725 (11 pp.).

* cited by examiner

BASE STATION, TERMINAL, AND HANDOVER METHOD

CROSS-REFERENCE TO RELATED APPLICATIONS

This application is a continuation of International Application No. PCT/CN2014/073001, filed on Mar. 6, 2014, which is hereby incorporated by reference in its entirety.

TECHNICAL FIELD

The present invention relates to the field of communications technologies, and in particular, to a base station, a terminal, and a handover method.

BACKGROUND

As packet services and intelligent terminals develop quickly, a high-speed service with a large data volume has an increasingly high requirement on spectrums. According to the latest released FCC International Spectrum White Paper, unlicensed and license-free spectrum resources are more than licensed spectrum resources. An unlicensed spectrum includes frequency bands used for industrial, scientific and medical (ISM) devices and the like. For example, there are three frequency bands in the United States: 902 MHz to 928 MHz, 2400 MHz to 2484.5 MHz, and 5725 MHz to 5850 MHz, where 2.4 GHz is a common ISM frequency band of various countries.

The Long Term Evolution system (LTE) of the 3rd Generation Partnership Project (3GPP) can effectively use unlicensed spectrum resources, and increase available spectrum bandwidths for LTE users. Therefore, it is suggested that LTE is widely applied to unlicensed spectrums. In addition to use of the ISM frequency band, in LTE, a licensed frequency band may also be shared in an authorized shared access (ASA; or LSA, licensed shared access) manner, for example, television white space (TVWS) is used. In this case, a priority of an authorized user is higher than that of a secondary user, that is, an unauthorized user sharing the licensed frequency band.

In an application, LTE needs to detect whether a device, for example, a radar, is using an unlicensed spectrum. Once detecting that a device, for example, a radar, is using the unlicensed spectrum, LTE needs to stop sending information on the unlicensed spectrum, and switch to an available unlicensed spectrum. Because a signal of the device, for example, a radar, may be random and dynamic, handover between unlicensed spectrums also needs to be dynamic.

Existing handover between spectrums is static or semi-static, which cannot meet the requirement of dynamic handover in LTE. In addition, a user data interruption is caused in a handover process, affecting the user experience.

SUMMARY

In view of this, embodiments of the present invention provide a base station, a terminal, and a handover method, so as to perform dynamic handover.

A first aspect provides a base station, where the base station includes: a sending module, configured to send an indication message to a terminal, where the indication message is used to instruct the terminal to further establish a connection to the base station through a second channel in a case in which the terminal maintains a connection to the base station through a first channel, and the first channel and the second channel are on different frequencies; a receiving module, configured to receive, through the first channel, an access message sent by the terminal, where the access message indicates that the terminal has established the connection to the base station through the second channel; the sending module, further configured to send a handover command to the terminal, where the handover command instructs the terminal to switch the communication with the base station from the first channel to the second channel; and a handover module, configured to switch the communication with the terminal from the first channel to the second channel.

In a first possible implementation manner of the first aspect, the indication message further includes a random access occasion parameter, and the base station further includes a discretization module, configured to discretize, by using the random access occasion parameter, an occasion on which the terminal randomly establishes the connection to the base station through the second channel.

In a second possible implementation manner of the first aspect, the handover command further includes a channel handover time, and the channel handover time is used to indicate a time point at which the terminal switches from the first channel to the second channel.

With reference to the first aspect or the second possible implementation manner of the first aspect, in a third possible implementation manner, the handover command further includes a channel configuration, and the channel configuration indicates a configuration used when the terminal performs data transmission through the second channel.

With reference to the third possible implementation manner of the first aspect, in a fourth possible implementation manner, the channel configuration instructs the terminal to communicate with the base station on the second channel by using a same configuration as that of the first channel, where the same configuration refers to that bandwidths of frequency resources of the first channel and the second channel remain unchanged, and that center frequencies of the first channel and the second channel deviate by a relative value, and the relative value is a difference between the frequencies of the first channel and the second channel.

With reference to the third possible implementation manner of the first aspect, in a fifth possible implementation manner, the channel configuration instructs the terminal to keep the first channel enabled until buffer data on the first channel is sent and received completely, and to communicate with the base station on the second channel by using a different configuration from that of the first channel.

A second aspect provides a terminal, where the terminal includes: a receiving module, configured to receive an indication message sent by a base station, where the indication message is used to instruct the terminal to further establish a connection to the base station through a second channel in a case in which the terminal maintains a connection to the base station through a first channel, and the first channel and the second channel are on different frequencies; a connection module, configured to establish the connection to the base station through the second channel; a sending module, configured to send an access message to the base station through the first channel, where the access message indicates that the terminal has established the connection to the base station through the second channel; the receiving module, further configured to receive a handover command sent by the base station, where the handover command instructs the terminal to switch the communication with the base station from the first channel to the second channel; and a handover module, configured to switch the communication with the base station from the first channel to the second channel.

In a first possible implementation manner of the second aspect, the indication message further includes a random access occasion parameter, the random access occasion parameter is used to discretize an occasion on which the terminal randomly establishes the connection to the base station through the second channel, and the connection module is further configured to establish the connection to the base station by the terminal through the second channel according to the occasion on which the connection to the base station is randomly established.

In a second possible implementation manner of the second aspect, the handover command further includes a channel handover time, and the channel handover time is used to indicate a time point at which the terminal switches from the first channel to the second channel.

With reference to the second aspect or the second possible implementation manner of the second aspect, in a third possible implementation manner, the handover command further includes a channel configuration, and the channel configuration indicates a configuration used when the terminal performs data transmission through the second channel.

With reference to the third possible implementation manner of the second aspect, in a fourth possible implementation manner, the channel configuration instructs the terminal to communicate with the base station on the second channel by using a same configuration as that of the first channel, where the same configuration refers to that bandwidths of frequency resources of the first channel and the second channel remain unchanged, and that center frequencies of the first channel and the second channel deviate by a relative value, and the relative value is a difference between the frequencies of the first channel and the second channel.

With reference to the third possible implementation manner of the second aspect, in a fifth possible implementation manner, the channel configuration instructs the terminal to keep the first channel enabled until buffer data on the first channel is sent and received completely, and to communicate with the base station on the second channel by using a different configuration from that of the first channel.

A third aspect provides a base station, where the base station includes a network interface, a memory, a processor, and a bus, and the network interface, the memory, and the processor are connected to the bus, where the memory is configured to store a program, and the processor is configured to invoke the program to perform the following steps: sending an indication message to a terminal through the network interface, where the indication message is used to instruct the terminal to further establish a connection to the base station through a second channel in a case in which the terminal maintains a connection to the base station through a first channel, and the first channel and the second channel are on different frequencies; receiving, through the first channel, an access message sent by the terminal, where the access message indicates that the terminal has established the connection to the base station through the second channel; sending a handover command to the terminal through the network interface, where the handover command instructs the terminal to switch the communication with the base station from the first channel to the second channel; and switching the communication with the terminal from the first channel to the second channel.

In a first possible implementation manner of the third aspect, the indication message further includes a random access occasion parameter, and the program further performs the following step: discretizing, by using the random access occasion parameter, an occasion on which the terminal randomly establishes the connection to the base station through the second channel.

In a second possible implementation manner of the third aspect, the handover command further includes a channel handover time, and the channel handover time is used to indicate a time point at which the terminal switches from the first channel to the second channel.

With reference to the third aspect or the second possible implementation manner of the third aspect, in a third possible implementation manner, the handover command further includes a channel configuration, and the channel configuration indicates a configuration used when the terminal performs data transmission through the second channel.

With reference to the third possible implementation manner of the third aspect, in a fourth possible implementation manner, the channel configuration instructs the terminal to communicate with the base station on the second channel by using a same configuration as that of the first channel, where the same configuration refers to that bandwidths of frequency resources of the first channel and the second channel remain unchanged, and that center frequencies of the first channel and the second channel deviate by a relative value, and the relative value is a difference between the frequencies of the first channel and the second channel.

With reference to the third possible implementation manner of the third aspect, in a fifth possible implementation manner, the channel configuration instructs the terminal to keep the first channel enabled until buffer data on the first channel is sent and received completely, and to communicate with the base station on the second channel by using a different configuration from that of the first channel.

A fourth aspect provides a terminal, where the terminal includes a network interface, a memory, a processor, and a bus, and the network interface, the memory, and the processor are connected to the bus, where the memory is configured to store a program, and the processor is configured to invoke the program to perform the following steps: receiving, through the network interface, an indication message sent by a base station, where the indication message is used to instruct the terminal to further establish a connection to the base station through a second channel in a case in which the terminal maintains a connection to the base station through a first channel, and the first channel and the second channel are on different frequencies; establishing the connection to the base station through the second channel; sending an access message to the base station through the first channel, where the access message indicates that the terminal has established the connection to the base station through the second channel; further receiving, through the network interface, a handover command sent by the base station, where the handover command instructs the terminal to switch the communication with the base station from the first channel to the second channel; and switching the communication with the base station from the first channel to the second channel.

In a first possible implementation manner of the fourth aspect, the indication message further includes a random access occasion parameter, the random access occasion parameter is used to discretize an occasion on which the terminal randomly establishes the connection to the base station through the second channel, and the program further performs the following step: instructing the terminal to establish the connection to the base station through the second channel according to the occasion on which the connection to the base station is randomly established.

In a second possible implementation manner of the fourth aspect, the handover command further includes a channel handover time, and the channel handover time is used to indicate a time point at which the terminal switches from the first channel to the second channel.

With reference to the fourth aspect or the second possible implementation manner of the fourth aspect, in a third possible implementation manner, the handover command further includes a channel configuration, and the channel configuration indicates a configuration used when the terminal performs data transmission through the second channel.

With reference to the third possible implementation manner of the fourth aspect, in a fourth possible implementation manner, the channel configuration instructs the terminal to communicate with the base station on the second channel by using a same configuration as that of the first channel, where the same configuration refers to that bandwidths of frequency resources of the first channel and the second channel remain unchanged, and that center frequencies of the first channel and the second channel deviate by a relative value, and the relative value is a difference between the frequencies of the first channel and the second channel.

With reference to the third possible implementation manner of the fourth aspect, in a fifth possible implementation manner, the channel configuration instructs the terminal to keep the first channel enabled until buffer data on the first channel is sent and received completely, and to communicate with the base station on the second channel by using a different configuration from that of the first channel.

A fifth aspect provides a handover method, where the method includes the following steps: sending, by a base station, an indication message to a terminal, where the indication message is used to instruct the terminal to further establish a connection to the base station through a second channel in a case in which the terminal maintains a connection to the base station through a first channel, and the first channel and the second channel are on different frequencies; receiving, by the base station through the first channel, an access message sent by the terminal, where the access message indicates that the terminal has established the connection to the base station through the second channel; sending, by the base station, a handover command to the terminal, where the handover command instructs the terminal to switch the communication with the base station from the first channel to the second channel; and switching, by the base station, communication with the terminal from the first channel to the second channel.

In a first possible implementation manner of the fifth aspect, the base station includes a primary cell and a secondary cell, and the secondary cell includes the first channel and the second channel;

the step of sending, by the base station, the indication message to the terminal includes: sending, by the base station, the indication message to the terminal through the first channel or the primary cell; and the step of sending, by the base station, the handover command to the terminal further includes: sending, by the base station, the handover command to the terminal through the first channel or the primary cell.

In a first possible implementation manner of the fifth aspect, in a second possible implementation manner, the indication message further includes a random access occasion parameter, and the random access occasion parameter is used to discretize an occasion on which the terminal randomly establishes the connection to the base station through the second channel.

With reference to the first possible implementation manner of the fifth aspect, in a third possible implementation manner of the fifth aspect, the handover command further includes a channel handover time, and the channel handover time is used to indicate a time point at which the terminal switches from the first channel to the second channel.

With reference to the first or third possible implementation manner of the fifth aspect, in a fourth possible implementation manner, the handover command further includes a channel configuration, and the channel configuration indicates a configuration used when the terminal performs data transmission through the second channel.

With reference to the fourth possible implementation manner of the fifth aspect, in a fifth possible implementation manner, the channel configuration instructs the terminal to communicate with the base station on the second channel by using a same configuration as that of the first channel, where the same configuration refers to that bandwidths of frequency resources of the first channel and the second channel remain unchanged, and that center frequencies of the first channel and the second channel deviate by a relative value, and the relative value is a difference between the frequencies of the first channel and the second channel.

With reference to the fourth possible implementation manner of the fifth aspect, in a sixth possible implementation manner, the channel configuration instructs the terminal to keep the first channel enabled until buffer data on the first channel is sent and received completely, and to communicate with the base station on the second channel by using a different configuration from that of the first channel.

A sixth aspect provides a handover method, where the method includes the following steps: receiving, by a terminal, an indication message sent by a base station, where the indication message is used to instruct the terminal to further establish a connection to the base station through a second channel in a case in which the terminal maintains a connection to the base station through a first channel, and the first channel and the second channel are on different frequencies; establishing, by the terminal, the connection to the base station through the second channel; sending, by the terminal, an access message to the base station through the first channel, where the access message indicates that the terminal has established the connection to the base station through the second channel; receiving, by the terminal, a handover command sent by the base station, where the handover command instructs the terminal to switch the communication with the base station from the first channel to the second channel; and switching, by the terminal, communication with the base station from the first channel to the second channel.

In a first possible implementation manner of the sixth aspect, the indication message further includes a random access occasion parameter, the random access occasion parameter is used to discretize an occasion on which the terminal randomly establishes the connection to the base station through the second channel, and the establishing, by the terminal, the connection to the base station through the second channel further includes: establishing, by the terminal, the connection to the base station through the second channel according to the occasion on which the connection to the base station is randomly established.

In a second possible implementation manner of the sixth aspect, the handover command further includes a channel handover time, and the channel handover time is used to indicate a time point at which the terminal switches from the first channel to the second channel.

With reference to the sixth aspect or the second possible implementation manner of the sixth aspect, in a third possible implementation manner, the handover command further includes a channel configuration, and the channel configuration indicates a configuration used when the terminal performs data transmission through the second channel.

With reference to the third possible implementation manner of the sixth aspect, in a fourth possible implementation manner, the channel configuration instructs the terminal to communicate with the base station on the second channel by using a same configuration as that of the first channel, where the same configuration refers to that bandwidths of frequency resources of the first channel and the second channel remain unchanged, and that center frequencies of the first channel and the second channel deviate by a relative value, and the relative value is a difference between the frequencies of the first channel and the second channel.

With reference to the third possible implementation manner of the sixth aspect, in a fifth possible implementation manner, the channel configuration instructs the terminal to keep the first channel enabled until buffer data on the first channel is sent and received completely, and to communicate with the base station on the second channel by using a different configuration from that of the first channel.

According to the foregoing technical solutions, the embodiments of the present invention provide a base station, where the base station further sends a handover command to a terminal in a case in which the base station receives, through a first channel, an access message that is sent by the terminal and that indicates that the terminal has established the connection to the base station through a second channel, so as to instruct the terminal to switch the communication with the base station from the first channel to the second channel, and to switch the communication with the terminal from the first channel to the second channel. Therefore, in the embodiment of the present invention, a base station and a terminal can perform dynamic channel handover, which accelerates handover, maintains continuity of data transmission, and improves user experience.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
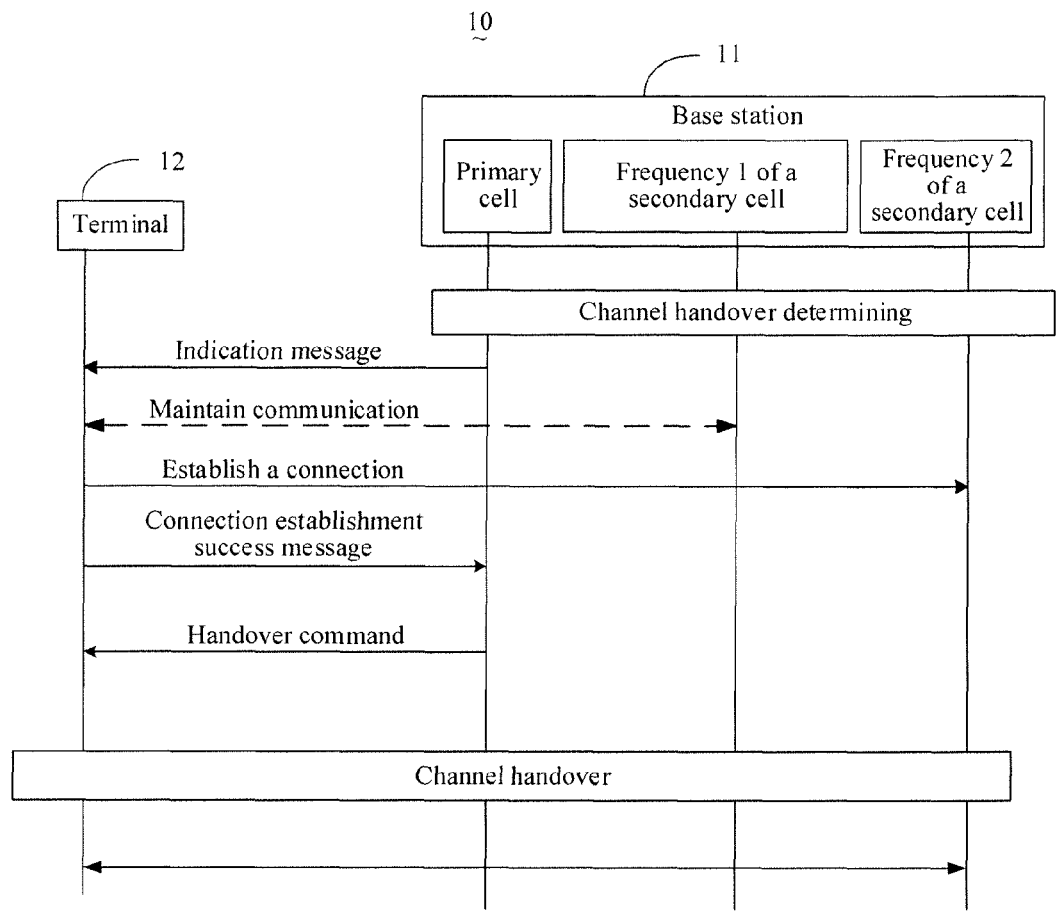
FIG. 1 is a schematic operating diagram of performing channel handover by a handover system according to an embodiment of the present invention.

Referring to FIG. 1 first, FIG. 1 is a schematic operating diagram of performing channel handover by a handover system according to an embodiment of the present invention. As shown in FIG. 1, the handover system 10 in this embodiment of the present invention includes a base station 11 and a terminal 12.

The base station 11 transfers information to the terminal 12 in real time by using a mobile communications switching center. When a channel for communication between the terminal 12 and the base station 11 needs to be disabled because of interference from a device, for example, a radar, or for a reason of energy saving, the base station 11 and the terminal 12 both need to perform channel handover, to maintain communication quality. In this embodiment, channel handover may be understood as adjustment of communication between a base station and a terminal from a frequency to another frequency.

Specifically, a carrier aggregation technology is used as an example. The base station 11 includes a primary cell and a secondary cell, and assuming that the base station 11 operates on a first channel of the secondary cell, the base station 11 needs to switch an operating channel of the secondary cell from the first channel to a second channel. The base station 11 first sends an indication message to the terminal 12 by using the primary cell, to instruct the terminal 12 to maintain communication with the base station 11 through the first channel (that is, a channel on frequency 1), and to establish a connection to the base station 11 through the second channel. After establishing the connection to the base station 11 through the second channel, the terminal 12 sends a connection establishment success message to the base station 11 through the first channel. The base station 11 further sends a handover command to the terminal 12 by using the primary cell, to instruct to switch the communication between the terminal 12 and the base station 11 from the first channel to the second channel.

In this embodiment, the foregoing handover command further indicates that handover by the terminal from the first channel to the second channel is maintained synchronous with handover by the base station from the first channel to the second channel, so as to ensure that the secondary cell has a channel to maintain communication with the terminal at any moment, which improves user experience.

It should be noted that the base station 11 may send the indication message and the handover command to the terminal 12 through the first channel of the secondary cell.

Therefore, the base station 11 and the terminal 12 of the handover system 10 in this embodiment may synchronously perform channel handover, which accelerates handover, maintains continuity of data transmission, and improves user experience.

Specific structures and operating principles of the base station 11 and the terminal 12 in the foregoing embodiment are described below in detail.

Figure 2:
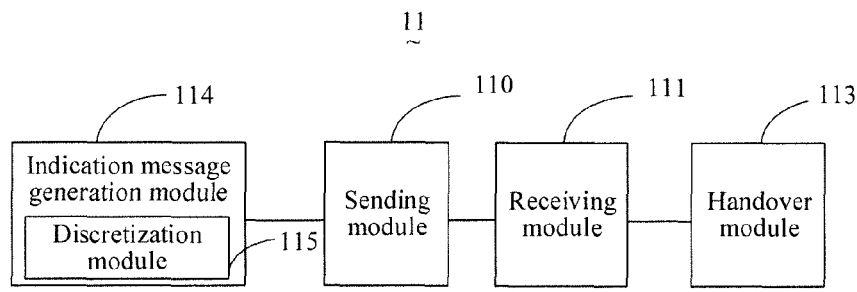
FIG. 2 is a schematic structural diagram of a base station according to an embodiment of the present invention.

Referring to FIG. 2, FIG. 2 is a schematic structural diagram of a base station according to an embodiment of the present invention. As shown in FIG. 2, the base station 11 in this embodiment includes a sending module 110, a receiving module 111, and a handover module 113.

The sending module 110 is configured to send an indication message to the terminal 12, where the indication message is used to instruct the terminal 12 to further establish a connection to the base station 11 through a second channel in a case in which the terminal 12 maintains a connection to the base station 11 through a first channel, and the first channel and the second channel are on different frequencies. As described above, the sending module 110 sends the indication message to the terminal 12 specifically through the first channel or a primary cell.

The receiving module 111 is configured to receive, through the first channel, an access message sent by the terminal 12, where the access message is used to indicate that the terminal 12 has established the connection to the base station 11 through the second channel.

The sending module 110 is further configured to send a handover command to the terminal 12, where the handover command instructs the terminal 12 to switch the communication with the base station 11 from the first channel to the second channel. As described above, the sending module 110 sends the handover command to the terminal 12 specifically through the first channel or the primary cell.

The handover module 113 is configured to switch the communication with the terminal 12 from the first channel to the second channel.

Therefore, the base station 11 and the terminal 12 in this embodiment may synchronously perform channel handover, which accelerates handover, maintains continuity of data transmission, and improves user experience.

Optionally, the base station 11 further includes an indication message generation module 114, where the indication message generation module 114 is configured to: determine whether the first channel that is providing a service is interfered, for example, is interfered by a radar signal; and generate an indication message when a strength of an interference signal is greater than or equal to a preset interference detection threshold.

The indication message generation module 114 may be further configured to generate an indication message in a case in which the first channel needs to be disabled because of energy saving and the like.

Optionally, the indication message includes a frequency of the second channel. The frequency of the second channel has multiple expression manners, such as an absolute frequency, a logical value (Absolute Radio Frequency Channel Number, ARFCN), and an offset from the frequency (that is, the foregoing frequency 1) of the first channel.

When an expression manner of the frequency of the second channel is the logical value or the offset from the frequency of the first channel, the absolute frequency may be calculated according to the logical value or the frequency of the first channel and the offset from the frequency of the first channel.

Further, the indication message further includes a random access occasion parameter. The indication message generation module 114 further includes a discretization module 115, configured to discretize, by using the random access occasion parameter, an occasion on which the terminal 12 randomly establishes the connection to the base station 11 through the second channel.

In this embodiment, the second channel may be a licensed channel or may be a unlicensed channel.

When the second channel is a unlicensed channel, many users use the second channel, which easily causes generation of congestion when the terminal 12 establishes a connection to the base station 11 through the second channel. To avoid generation of a phenomenon of congestion to the greatest extent, in this embodiment, the base station 11 instructs the terminal 12 to randomly establish a connection to the base station 11 through the second channel. Specifically, the occasion on which the terminal 12 establishes a connection to the base station 11 through the second channel needs to be discretized by using the random access occasion parameter, that is, a random occasion may be generated within a time period in which the terminal 12 establishes a connection to the base station 11 through the second channel, and the terminal 12 establishes a connection to the base station 11 according to the random occasion, thereby avoiding that all terminals establish a connection to the base station 11 on a same occasion.

For example, if a time period for connection establishment delivered by the base station 11 is 10 ms (currently, one subframe in LTE is 1 ms), the terminal 12 may randomly derive a random number (that is, the foregoing random occasion), that is, 0 to 9. If the derived random number is 5, the terminal 12 is instructed to establish a connection to the base station 11 in a fifth subframe through the second channel after the indication message is received.

A manner for randomly establishing a connection between the terminal 12 and the base station 11 includes two types: a contention mode and a non-contention mode.

In another optional embodiment, the base station 11 may further instruct the terminal 12 to directly establish a connection to the base station 11 through the second channel. For example, if the base station 11 considers that the terminal 12 does not need to acquire an uplink timing advance by using a random access process or an uplink timing advance does not need to be changed, the base station 11 may instruct the terminal 12 to directly establish a connection to the base station 11 through the second channel.

Optionally, the access message that is sent by the terminal 12 and that is received by the receiving module 111 includes a message that the terminal already randomly establishes the connection to the base station 11 through the second channel or that the terminal 12 already directly establishes a connection to the base station 11 through the second channel.

Optionally, the handover command sent by the sending module 110 includes a channel handover time, and the channel handover time is used to indicate a time point at which the terminal 12 switches from the first channel to the second channel. For example, if the channel handover time is a System Frame Number (SFN), the terminal 12 performs channel handover on a boundary of the SFN. The handover module 113 also performs channel handover on the boundary of the SFN, to ensure that handover by the handover module 113 is synchronous with handover by the terminal 12.

Optionally, the handover command further includes a channel configuration, and the channel configuration indicates a configuration used when the terminal 12 performs data transmission through the second channel.

The channel configuration used when the terminal 12 performs data transmission through the second channel may include two types:

A first channel configuration is: the terminal 12 communicates with the base station 11 on the second channel by using a same configuration as that of the first channel.

Specifically, the frequency of the first channel needs to be completely aligned with the frequency of the second channel in a time domain, for example, a boundary of an SFN of the first channel is completely aligned with a boundary of an SFN of the second channel. Bandwidths of frequency resources of the first channel and the second channel remain unchanged, center frequencies of the first channel and the second channel deviate by a relative value, and the relative value is a difference between the frequencies of the first channel and the second channel. For example, a configuration of Media Access Control (MAC), and buffer data and a configuration of Hybrid Automatic Repeat Request (HARQ) remain unchanged; an acknowledgement (ACK)/negative acknowledgement (NACK) is still fed back in an original time domain, and a frequency at which the ACK/NACK is fed back is added to the difference from the frequency of the first channel.

Figure 3:
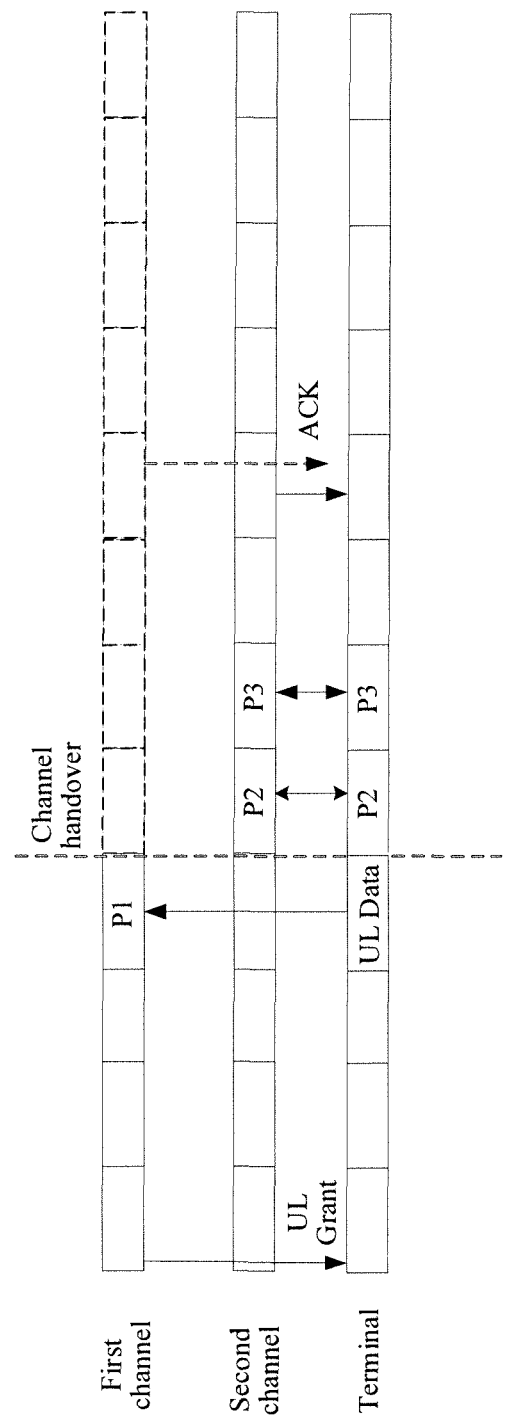
FIG. 3 shows a process of synchronously switching the communication between a base station and a terminal from a first channel to a second channel according to a first channel configuration according to an embodiment of the present invention.
Figure 4:
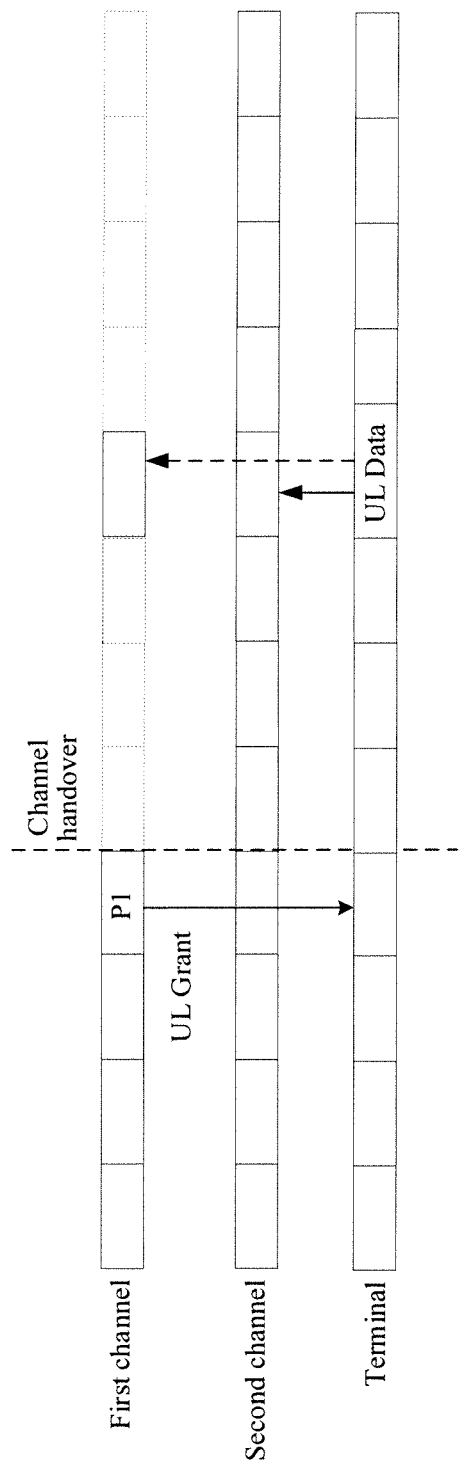
FIG. 4 shows another process of synchronously switching the communication between a base station and a terminal from a first channel to a second channel according to a first channel configuration according to an embodiment of the present invention.

A specific process of synchronously switching the communication between the base station 11 and the terminal 12 from the first channel to the second channel is shown in FIG. 3 and FIG. 4. Referring to FIG. 3 first, FIG. 3 is about HARQ processing. As shown in FIG. 3, the base station 11 sends a UL Grant (an uplink grant) to the terminal 12 in the first subframe through the first channel, to instruct the terminal 12 to send UL Data (uplink data) to the base station 11 in the fourth subframe according to the UL Grant through the first channel. Assuming that channel handover occurs in the terminal 12 in the fifth subframe, the terminal 12 starts to transmit data on the second channel, and the terminal disables the first channel at the same time. In this case, channel handover also occurs in the base station 11 in the fifth subframe, the base station 11 starts to transmit data on the second channel, and the base station 11 also disables the first channel at the same time. However, after channel handover, an ACK/NACK feedback of the uplink data originally fed back by the base station 11 in the eighth subframe of the first channel is fed back in the eighth subframe of the second channel, a same time domain resource is used, and the center frequency deviates by the relative value, and the relative value is a difference between the frequencies of the first channel and the second channel.

Then, referring to FIG. 4, FIG. 4 is about processing on UL data. As shown in FIG. 4, the terminal 12 receives a UL Grant in the fourth subframe, and the terminal 12 sends the UL data to the base station 11 in the eighth subframe according to the UL Grant through the first channel. Assuming that channel handover occurs in the terminal 12 in the fifth subframe, and the terminal 12 disables the first channel at the same time, the terminal sends the UL data to the base station 11 in the eighth subframe according to the UL Grant through the second channel. Therefore, the base station 11 and the terminal 12 synchronously perform channel handover.

There are two UL Grant resource allocation manners. For example, in a 20-MHz cell, a frequency domain in a subframe may be evenly divided into 100 available physical resource blocks (PRB), that is, numbering is performed from 0 to 99.

A first resource allocation manner is: a frequency domain resource includes a start address and a length, which may indicate a start position and a length of an uplink physical resource block.

A second resource allocation manner is: a frequency domain resource includes a specific position, and this type may indicate a specific position of an uplink physical resource block.

As described above, a channel for communication between the terminal 12 and the base station 11 needs to be switched from the first channel to the second channel, which generates a frequency deviation, and the terminal 12 needs to calculate a specific position of the UL Grant again in the foregoing manner.

The first channel configuration used when the terminal 12 performs data transmission on the second channel is described above, and the second channel configuration is described below:

the terminal 12 maintains a communication connection to the first channel until the buffer data on the first channel is sent and received completely, and communicates with the base station 11 on the second channel by using a different configuration from that of the first channel.

Specifically, the frequency of the first channel needs to be completely aligned with the frequency of the second channel in a time domain, for example, a boundary of an SFN of the first channel is completely aligned with a boundary of an SFN of the second channel. The terminal 12 uses the different configuration from that of the first channel on the second channel. The foregoing configuration includes at least one of the following information: an information frequency, a bandwidth, a physical layer, a MAC layer configuration, or the like. The foregoing configuration may be a default configuration, or may be a different configuration that is performed in advance. Further, when the terminal 12 is instructed to transmit new data on the second channel, a communication connection to the first channel is maintained until buffer data on the first channel before a channel handover moment is sent and received completely.

Figure 5:
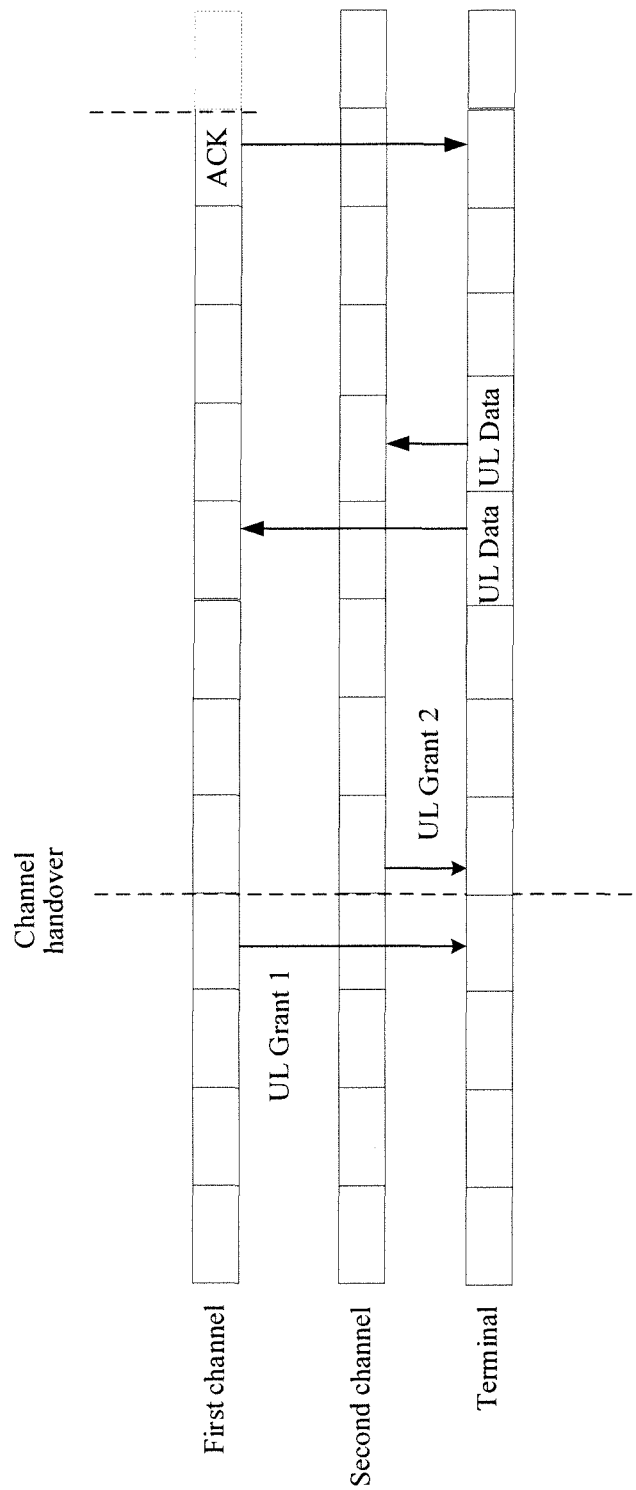
FIG. 5 shows a process of synchronously switching the communication between a base station and a terminal from a first channel to a second channel according to a second channel configuration according to an embodiment of the present invention.
Figure 6:
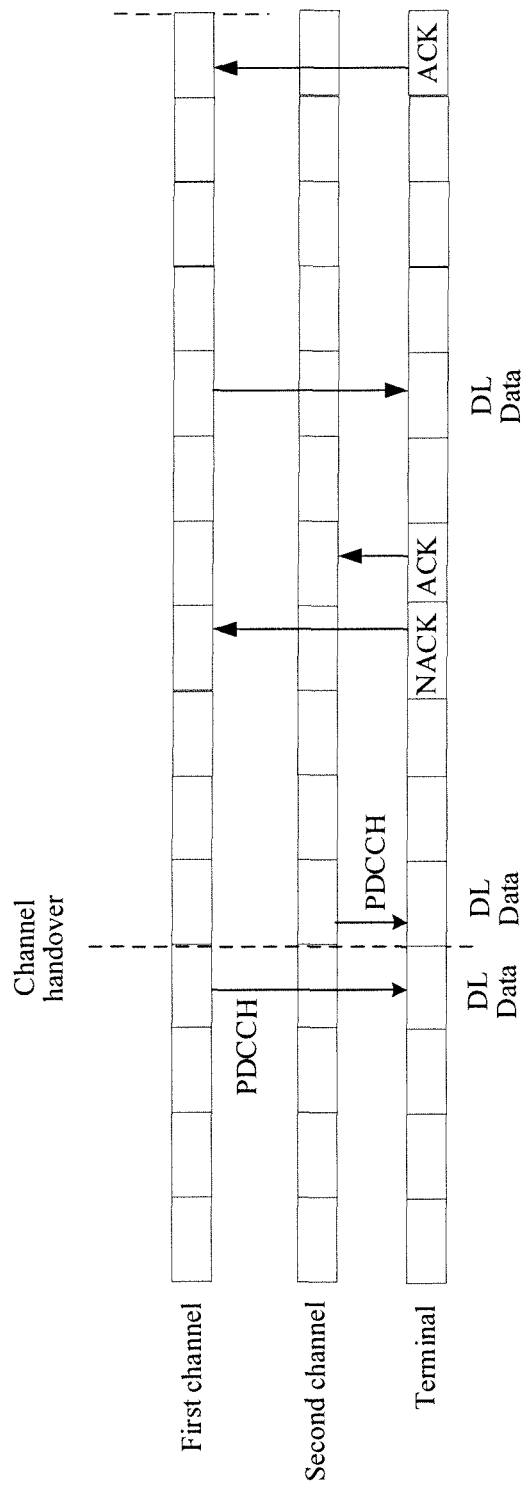
FIG. 6 shows another process of synchronously switching the communication between a base station and a terminal from a first channel to a second channel according to a second channel configuration according to an embodiment of the present invention.

An example of a manner for using the second channel configuration is as follows:

Refer to FIG. 5 and FIG. 6 for a specific process of synchronously switching the communication between the base station 11 and the terminal 12 from the first channel to the second channel, and a description is also performed by using an example of HARQ feedback and UL scheduling.

Referring to FIG. 5 first, the base station 11 allocates a UL Grant 1 to the terminal 12 in the fourth subframe through the first channel, and starts to perform channel handover in the fifth subframe, that is, allocates a UL Grant 2 to the terminal 12 through the second channel, and maintains communication with the first channel at the same time. In this case, the terminal 12 also starts to perform channel handover in the fifth subframe, that is, receives, through the second channel, the UL Grant 2 allocated by the base station 11, and maintains communication with the first channel at the same time, that is, sends uplink data in the eighth subframe according to the UL Grant 1 through the first channel, and sends uplink data in the ninth subframe according to the UL Grant 2 through the second channel. In addition, after feeding back an ACK to the terminal 12 in the thirteenth subframe through the first channel, the base station 11 completes transferring of related data on the first channel before a handover moment, so as to disable the first channel; after receiving an ACK feedback sent by the base station 11, the terminal 12 also disables the first channel.

Then, referring to FIG. 6, for downlink data, uplink HARQ feedback needs to be performed by delaying by four subframes. The base station 11 schedules downlink data in the fourth subframe through the first channel, and starts to perform channel handover in the fifth subframe, that is, schedules downlink data through the second channel, and maintains communication with the first channel at the same time. Meanwhile, the terminal 12 also performs channel handover in the fifth subframe, that is, receives, through the second channel, the downlink data sent by the base station 11, and maintains communication with the first channel at the same time, that is, the terminal 12 performs HARQ feedback in the eighth subframe through the first channel, and the terminal performs HARQ feedback in the ninth subframe through the second channel. If the terminal 12 fails to parse the downlink data that is scheduled by the base station 11 through the first channel, for example, CRC fails, the terminal 12 feeds back a NACK to the base station 11 through the first channel, the base station 11 continues, according to the NACK, to perform retransmission in the eleventh subframe, and the terminal 12 continues to perform HRAQ feedback in the fifteenth subframe. If an ACK is fed back, and there is no other buffer data, the terminal 12 disables the first channel. The base station 11 also disables the first channel at the same time.

There are several following manners for sending a handover command by the sending module 110:

First: A handover command is sent by a radio resource control message, where the message may be obtained by extending an existing dedicated message, or a message is redefined, or a system message may be used, and a channel configuration is indicated by using the system message.

Second: A handover command is sent by a MAC control element (MAC CE), where, specifically, a MAC CE is defined.

Third: A handover command is sent by a physical layer message, for example, a Downlink Control Information (DCI) type is defined, and is included on a Physical Downlink Control Channel (PDCCH), where the DCI type includes a channel handover time and a channel configuration.

Therefore, in this embodiment, on one hand, the base station 11 and the terminal 12 in this embodiment may synchronously perform channel handover, which accelerates handover, maintains continuity of data transmission, and improves user experience; on the other hand, the base station 11 discretizes an occasion on which the terminal 12 establishes a connection to the base station 11 through a second channel, so that the terminal 12 randomly establishes the connection to the base station 11, which therefore can improve non-obstruction for the terminal 12 to establish a connection to the base station 11.

Figure 7:
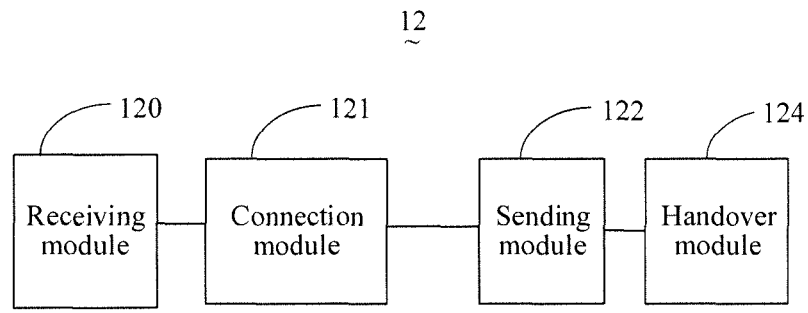
FIG. 7 is a schematic structural diagram of a terminal according to an embodiment of the present invention.

Referring to FIG. 7, FIG. 7 is a schematic structural diagram of a terminal according to an embodiment of the present invention. As shown in FIG. 7, the terminal 12 in this embodiment includes a receiving module 120, a connection module 121, a sending module 122, and a handover module 124.

The receiving module 120 is configured to receive an indication message sent by a base station 11, where the indication message is used to instruct the terminal 12 to further establish a connection to the base station 11 through a second channel in a case in which the terminal 12 maintains a connection to the base station 11 through a first channel, and the first channel and the second channel are on different frequencies.

The connection module 121 is configured to establish a connection to the base station 11 through the second channel.

The sending module 122 is configured to send an access message through the first channel, where the access message indicates that the terminal 12 has established the connection to the base station 11 through the second channel.

The receiving module 120 is further configured to receive a handover command sent by the base station 11, where the handover command is used to instruct the terminal 12 to switch the communication with the base station 11 from the first channel to the second channel.

The handover module 124 is configured to switch the communication with the base station 11 from the first channel to the second channel according to the handover command.

Therefore, the terminal 12 and the base station 11 in this embodiment may synchronously perform channel handover, which accelerates handover, maintains continuity of data transmission, and improves user experience.

Optionally, the indication message further includes a random access occasion parameter, and the random access occasion parameter is used to discretize an occasion on which the terminal 12 randomly establishes the connection to the base station 11 through the second channel. The connection module 121 is further configured to establish a connection to the base station 11 by the terminal through the second channel according to the occasion on which a connection to the base station 11 is randomly established.

That an occasion on which the terminal 12 randomly establishes the connection to the base station 11 through the second channel is discretized by using the random access occasion parameter is described above, and is not described herein again.

A manner for randomly establishing a connection between the terminal 12 and the base station 11 includes two types: a contention mode and a non-contention mode.

Figure 8:
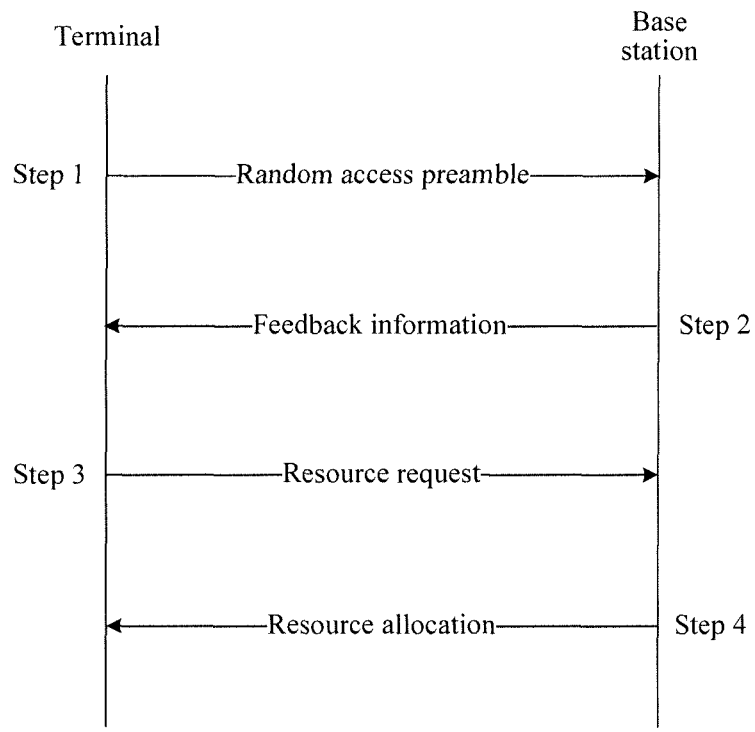
FIG. 8 is a principle diagram when a manner for randomly establishing a connection between a terminal and a base station is a contention mode.

Specifically, when the connection establishment manner is a contention mode, also referring to FIG. 8, the manner specifically includes the following steps:

Step 1: The terminal 12 sends a random access Preamble used for synchronization to the base station 11.

Step 2: The base station 11 sends response feedback information, a resource that can be used by the terminal 12 to send resource request information, and the like to the terminal 12.

Step 3: The terminal 12 sends a resource request to the base station 11 by using a resource allocated by the base station 11.

Step 4: The base station 11 feeds back data sending resource allocation to the terminal 12.

According to the foregoing example, the terminal 12 is instructed to establish a connection to the base station 11 in the fifth subframe through the second channel after the indication message is received, and specifically, the terminal 12 performs the foregoing step 1 in the fifth subframe.

Figure 9:
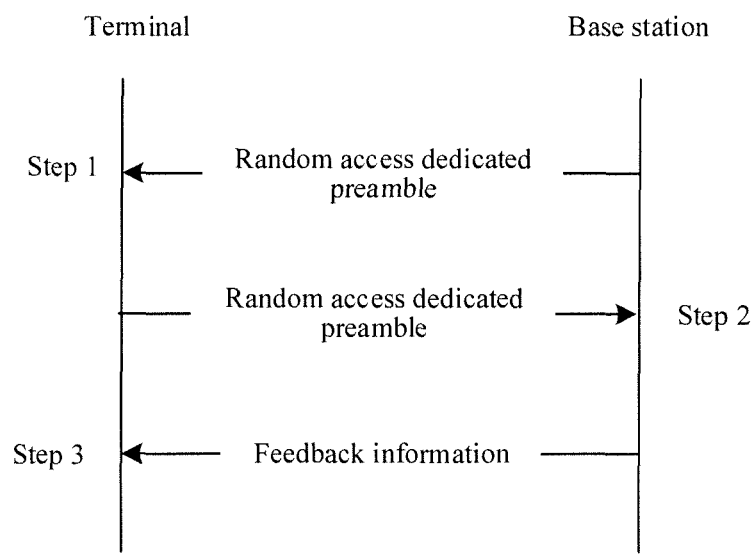
FIG. 9 is a principle diagram when a manner for randomly establishing a connection between a terminal and a base station is a non-contention mode.

When the connection establishment manner is a non-contention mode, also referring to FIG. 9, the manner specifically includes the following steps:

Step 1: The base station 11 allocates a random access dedicated preamble (RA Dedicated Preamble) to the terminal 12.

Step 2: The terminal 12 uses the allocated random access dedicated preamble, and sends a message about the use to the base station 11.

Step 3: The base station 11 sends response feedback information, a resource that can be used by the terminal 12 to send resource request information, and the like.

For the non-contention mode, the random access dedicated preamble allocated by the base station 11 may be included in the indication message.

In another optional embodiment, the base station 11 may further instruct the terminal 12 to directly establish a connection to the base station 11 through the second channel.

Optionally, the sending module 122 sends, to the base station 11, resource allocation information received in a contention mode or response feedback information that is sent by the base station 11 and that is received in a non-contention mode, and a message about a resource that can be used by the terminal 12 to send resource request information, and the like, or a message, such as a PSS/SSS and/or a system message, that is read when a connection to the base station 11 is directly established.

Optionally, the handover command includes a channel handover time, and the channel handover time is used to indicate a time point at which the terminal 12 switches from the first channel to the second channel. For example, if the channel handover time is an SFN, the terminal 12 performs channel handover on a boundary of the SFN. The handover module 113 also performs channel handover on the boundary of the SFN, to ensure that handover by the handover module 113 is synchronous with handover by the terminal 12.

Optionally, the handover command further includes a channel configuration, where the channel configuration is used to indicate a configuration used when the terminal 12 performs data transmission through the second channel.

There are two types of channel configurations:

A first channel configuration is: the channel configuration instructs the terminal 12 to communicate with the base station 11 on the second channel by using a same configuration as that of the first channel.

Specifically, the frequency of the first channel needs to be completely aligned with the frequency of the second channel in a time domain, for example, a boundary of an SFN of the first channel is completely aligned with a boundary of an SFN of the second channel. Bandwidths of frequency resources of the first channel and the second channel remain unchanged, center frequencies of the first channel and the second channel deviate by a relative value, and the relative value is a difference between the frequencies of the first channel and the second channel. For example, a configuration of MAC, and buffer data and a configuration of an HARQ remain unchanged; an ACK/NACK is still fed back in an original time domain, and a frequency at which the ACK/NACK is fed back is added to the difference from the frequency of the first channel.

A second channel configuration is: the channel configuration instructs the terminal 12 to keep the first channel enabled until buffer data on the first channel is sent and received completely, and to communicate with the base station 11 on the second channel by using a different configuration from that of the first channel.

Specifically, the frequency of the first channel needs to be completely aligned with the frequency of the second channel in a time domain, for example, a boundary of an SFN of the first channel is completely aligned with a boundary of an SFN of the second channel. The terminal 12 uses the different configuration from that of the first channel on the second channel. The foregoing configuration includes at least one of the following information: an information frequency, a bandwidth, a physical layer, a MAC layer configuration, or the like. The foregoing configuration may be a default configuration, or may be a different configuration that is performed in advance. Further, when the terminal 12 is instructed to transmit new data on the second channel, a communication connection to the first channel is maintained until buffer data on the first channel before a channel handover moment is sent and received completely.

A specific process of switching the communication between the terminal 12 and the base station 11 from the first channel to the second channel according to the channel handover time and the channel configuration is described above, and is not described herein again.

Therefore, in this embodiment, the base station 11 and the terminal 12 in this embodiment may synchronously perform channel handover, which accelerates handover, maintains continuity of data transmission, and improves user experience; on the other hand, the terminal 12 randomly establishes the connection to the base station 11 according to an occasion on which the terminal 12 establishes a connection to the base station 11 and that is discretized by the base station 11, which therefore can improve non-obstruction for the terminal 12 to establish a connection to the base station 11.

Figure 10:
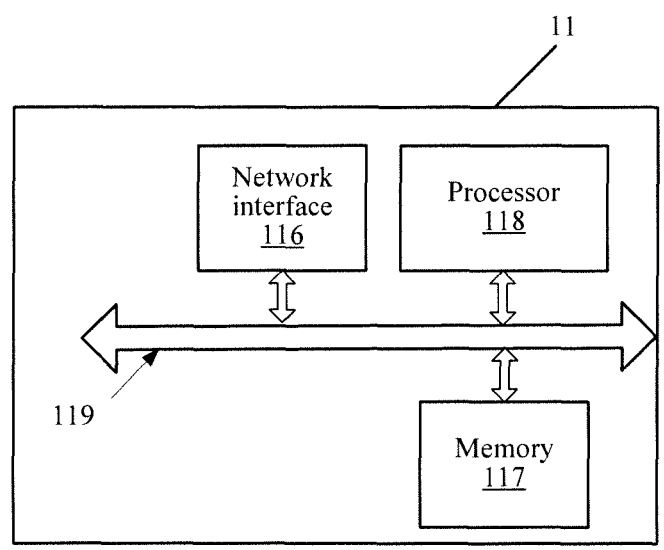
FIG. 10 is another schematic structural diagram of a base station according to an embodiment of the present invention.

Referring to FIG. 10, FIG. 10 is a schematic structural diagram of a base station according to an embodiment of the present invention. As shown in FIG. 10, in this embodiment, the base station 11 includes a network interface 116, a memory 117, a processor 118, and a bus 119, and the network interface 116, the memory 117, and the processor 118 are connected to the bus 119, where the memory 117 is configured to store a program, and the processor 118 is configured to invoke the program to perform the following steps:

sending an indication message to a terminal 12 through the network interface 116, where the indication message is used to instruct the terminal 12 to further establish a connection to the base station 11 through a second channel in a case in which the terminal 12 maintains a connection to the base station 11 through a first channel, and the first channel and the second channel are on different frequencies;

receiving, through the first channel, an access message sent by the terminal 12, where the access message is used to indicate that the terminal 12 has established the connection to the base station 11 through the second channel;

sending a handover command to the terminal 12 through the network interface 116, where the handover command is used to instruct the terminal 12 to switch the communication with the base station 11 from the first channel to the second channel; and switching the communication with the terminal 12 from the first channel to the second channel synchronously.

Optionally, a channel handover request further includes a random access occasion parameter, and the program further performs the following step:

discretizing, by using the random access occasion parameter, an occasion on which the terminal randomly establishes the connection to the base station 11 through the second channel.

A specific discretization principle is described above, and is not described herein again.

In another optional embodiment, the base station 11 may further instruct the terminal 12 to directly establish a connection to the base station 11 through the second channel.

Optionally, the handover command further includes a channel handover time, and the channel handover time is used to indicate a time point at which the terminal switches from the first channel to the second channel. For example, if the channel handover time is an SFN, the terminal 12 performs channel handover on a boundary of the SFN. The handover module 113 also performs channel handover on the boundary of the SFN, to ensure that handover by the handover module 113 is synchronous with handover by the terminal 12.

Optionally, the handover command further includes a channel configuration, and the channel configuration indicates a configuration used when the terminal performs data transmission through the second channel. There are two types of channel configurations:

A first channel configuration is: the channel configuration instructs the terminal 12 to communicate with the base station 11 on the second channel by using a same configuration as that of the first channel.

Specifically, the frequency of the first channel needs to be completely aligned with the frequency of the second channel in a time domain, for example, a boundary of an SFN of the first channel is completely aligned with a boundary of an SFN of the second channel. Bandwidths of frequency resources of the first channel and the second channel remain unchanged, center frequencies of the first channel and the second channel deviate by a relative value, and the relative value is a difference between the frequencies of the first channel and the second channel. For example, a configuration of MAC, and buffer data and a configuration of an HARQ remain unchanged; an ACK/NACK is still fed back in an original time domain, and a frequency at which the ACK/NACK is fed back is added to the difference from the frequency of the first channel.

A second channel configuration is: the channel configuration is used to instruct the terminal 12 to keep the first channel enabled until buffer data on the first channel is sent and received completely, and to communicate with the base station 11 on the second channel by using a different configuration from that of the first channel.

Specifically, the frequency of the first channel needs to be completely aligned with the frequency of the second channel in a time domain, for example, a boundary of an SFN of the first channel is completely aligned with a boundary of an SFN of the second channel. The terminal 12 uses the different configuration from that of the first channel on the second channel. The foregoing configuration includes at least one of the following information: an information frequency, a bandwidth, a physical layer, a MAC layer configuration, or the like. The foregoing configuration may be a default configuration, or may be a different configuration that is performed in advance. Further, when the terminal 12 is instructed to transmit new data on the second channel, a communication connection to the first channel is maintained until buffer data on the first channel before channel handover is sent and received completely.

A specific process of switching the communication between the terminal 12 and the base station 11 from the first channel to the second channel according to the channel handover time and the channel configuration is described above, and is not described herein again.

Therefore, in this embodiment, the base station 11 and the terminal 12 in this embodiment may synchronously perform channel handover, which accelerates handover, maintains continuity of data transmission, and improves user experience; on the other hand, the base station 11 discretizes an occasion on which the terminal 12 establishes a connection to the base station 11 through a second channel, so that the terminal 12 randomly establishes the connection to the base station 11, which therefore can improve non-obstruction for the terminal 12 to establish a connection to the base station 11.

Figure 11:
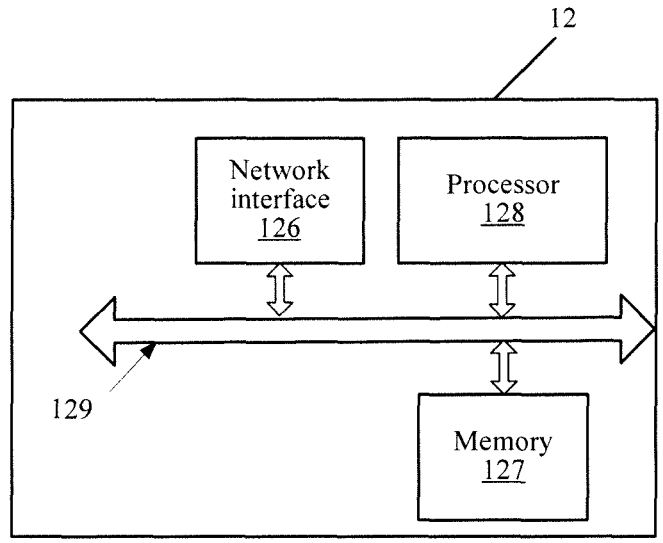
FIG. 11 is another schematic structural diagram of a terminal according to an embodiment of the present invention.

Referring to FIG. 11, FIG. 11 is a schematic structural diagram of a terminal according to an embodiment of the present invention. As shown in FIG. 11, the terminal 12 in this embodiment includes a network interface 126, a memory 127, a processor 128, and a bus 129, and the network interface 126, the memory 127, and the processor 128 are connected to the bus 129, where the memory 127 is configured to store a program, and the processor 128 is configured to invoke the program to perform the following steps:

receiving, through the network interface 126, an indication message sent by a base station 11, where the indication message is used to instruct the terminal 12 to further establish a connection to the base station 11 through a second channel in a case in which the terminal 12 maintains a connection to the base station 11 through a first channel, and the first channel and the second channel are on different frequencies;

establishing a connection to the base station 11 through the second channel;

sending an access message to the base station 11 through the first channel, where the access message indicates that the terminal 12 has established the connection to the base station 11 through the second channel;

further receiving, through the network interface 126, a handover command sent by the base station 11, where the handover command is used to instruct the base station 11 to switch the communication with the terminal 12 from the first channel to the second channel; and switching the communication with the base station 11 from the first channel to the second channel.

Optionally, the indication message further includes a random access occasion parameter, the random access occasion parameter is used to discretize an occasion on which the terminal 12 randomly establishes the connection to the base station 11 through the second channel, and the program further performs the following step:

instructing the terminal 12 to establish a connection to the base station 11 through the second channel according to the occasion on which a connection to the base station 11 is randomly established.

A specific process of randomly establishing a connection between the terminal 12 and the base station 11 is described above, and is not described herein again.

In another optional embodiment, the base station 11 may further instruct the terminal 12 to directly establish a connection to the base station 11 through the second channel.

Optionally, the handover command includes a channel handover time, and the channel handover time is used to indicate a time point at which the terminal 12 switches from the first channel to the second channel. For example, if the channel handover time is an SFN, the terminal 12 performs channel handover on a boundary of the SFN. The handover module 113 also performs channel handover on the boundary of the SFN, to ensure that handover by the handover module 113 is synchronous with handover by the terminal 12.

Optionally, the handover command further includes a channel configuration, where the channel configuration is used to indicate a configuration used when the terminal 12 performs data transmission through the second channel. There are two types of channel configurations:

A first channel configuration is: the channel configuration instructs the terminal 12 to communicate with the base station 11 on the second channel by using a same configuration as that of the first channel.

Specifically, the frequency of the first channel needs to be completely aligned with the frequency of the second channel in a time domain, for example, a boundary of an SFN of the first channel is completely aligned with a boundary of an SFN of the second channel. Bandwidths of frequency resources of the first channel and the second channel remain unchanged, center frequencies of the first channel and the second channel deviate by a relative value, and the relative value is a difference between the frequencies of the first channel and the second channel. For example, a configuration of MAC, and buffer data and a configuration of an HARQ remain unchanged; an ACK/NACK is still fed back in an original time domain, and a frequency at which the ACK/NACK is fed back is added to the difference from the frequency of the first channel.

A second channel configuration is: the channel configuration instructs the terminal 12 to keep the first channel enabled until buffer data on the first channel is sent and received completely, and to communicate with the base station 11 on the second channel by using a different configuration from that of the first channel.

Specifically, the frequency of the first channel needs to be completely aligned with the frequency of the second channel in a time domain, for example, a boundary of an SFN of the first channel is completely aligned with a boundary of an SFN of the second channel. The terminal 12 uses the different configuration from that of the first channel on the second channel. The foregoing configuration includes at least one of the following information: an information frequency, a bandwidth, a physical layer, a MAC layer configuration, or the like. The foregoing configuration may be a default configuration, or may be a different configuration that is performed in advance. Further, when the terminal 12 is instructed to transmit new data on the second channel, a communication connection to the first channel is maintained until buffer data on the first channel before channel handover is sent and received completely.

A specific process of switching the communication between the terminal 12 and the base station 11 from the first channel to the second channel according to the channel handover time and the channel configuration is described above, and is not described herein again.

Therefore, in this embodiment, the base station 11 and the terminal 12 in this embodiment may synchronously perform channel handover, which accelerates handover, maintains continuity of data transmission, and improves user experience; on the other hand, the terminal 12 randomly establishes the connection to the base station 11 according to an occasion on which the terminal 12 establishes a connection to the base station 11 and that is discretized by the base station 11, which therefore can improve non-obstruction for the terminal 12 to establish a connection to the base station 11.

In the several implementation manners provided in this application, it should be understood that the disclosed apparatus and method may be implemented in other manners. For example, the described implementation manners of the apparatus embodiment are merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the implementation manners of the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the implementation manners of the embodiments of this application. The foregoing storage medium includes: any medium that can store program code, such as a USB flash drive, a removable hard disk, a read-only memory (ROM), a random access memory (RAM), a magnetic disk, or an optical disc.

Based on the foregoing base station 11 and terminal 12, an embodiment of the present invention further separately provides a handover method of the base station 11 and a handover method of the terminal 12.

Figure 12:
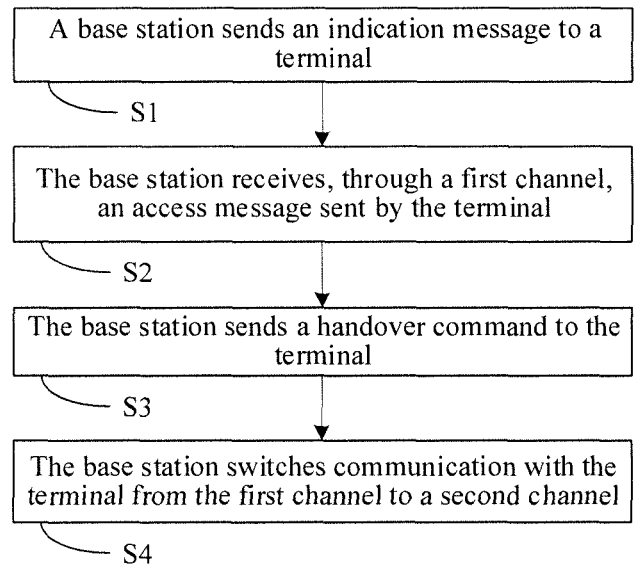
FIG. 12 is a flowchart of a handover method according to an embodiment of the present invention.

Referring to FIG. 12 first, FIG. 12 is a flowchart of a handover method provided based on the foregoing base station 11 according to an embodiment of the present invention. The method includes the following steps:

S1: A base station 11 sends an indication message to a terminal 12, where the indication message is used to instruct the terminal 12 to further establish a connection to the base station 11 through a second channel in a case in which the terminal 12 maintains a connection to the base station 11 through a first channel, and the first channel and the second channel are on different frequencies.

In this step, as described above, the base station 11 sends the indication message to the terminal 12 specifically through the first channel or a primary cell.

S2: The base station 11 receives, through the first channel, an access message sent by the terminal 12, where the access message is used to indicate that the terminal 12 has established the connection to the base station 11 through the second channel.

S3: The base station 11 sends a handover command to the terminal 12, where the handover command is used to instruct the terminal 12 to switch the communication with the base station 11 from the first channel to the second channel.

In this step, as described above, the base station 11 sends the handover command to the terminal 12 specifically through the first channel or the primary cell.

S4: The base station 11 switches communication with the terminal 12 from the first channel to the second channel.

Optionally, the indication message further includes a random access occasion parameter, and the random access occasion parameter is used to discretize an occasion on which the terminal 12 randomly establishes the connection to the base station 11 through the second channel. A specific discretization principle is described above, and is not described herein again.

In another optional embodiment, the base station 11 may further instruct the terminal 12 to directly establish a connection to the base station 11 through the second channel.

Optionally, the handover command includes a channel handover time, and the channel handover time is used to indicate a time point at which the terminal switches from the first channel to the second channel. For example, if the channel handover time is an SFN, the terminal 12 performs channel handover on a boundary of the SFN. The handover module 113 also performs channel handover on the boundary of the SFN, to ensure that handover by the handover module 113 is synchronous with handover by the terminal 12.

Optionally, the handover command further includes a channel configuration, where the channel configuration is used to indicate a configuration used when the terminal performs data transmission through the second channel. There are two types of channel configurations:

A first channel configuration is: the channel configuration instructs the terminal 12 to communicate with the base station 11 on the second channel by using a same configuration as that of the first channel.

Specifically, the frequency of the first channel needs to be completely aligned with the frequency of the second channel in a time domain, for example, a boundary of an SFN of the first channel is completely aligned with a boundary of an SFN of the second channel. Bandwidths of frequency resources of the first channel and the second channel remain unchanged, center frequencies of the first channel and the second channel deviate by a relative value, and the relative value is a difference between the frequencies of the first channel and the second channel. For example, a configuration of MAC, and buffer data and a configuration of an HARQ remain unchanged; an ACK/NACK is still fed back in an original time domain, and a frequency at which the ACK/NACK is fed back is added to the difference from the frequency of the first channel.

A second channel configuration is: the channel configuration instructs the terminal 12 to keep the first channel enabled until buffer data on the first channel is sent and received completely, and to communicate with the base station 11 on the second channel by using a different configuration from that of the first channel.

Specifically, the frequency of the first channel needs to be completely aligned with the frequency of the second channel in a time domain, for example, a boundary of an SFN of the first channel is completely aligned with a boundary of an SFN of the second channel. The terminal 12 uses the different configuration from that of the first channel on the second channel. The foregoing configuration includes at least one of the following information: an information frequency, a bandwidth, a physical layer, a MAC layer configuration, or the like. The foregoing configuration may be a default configuration, or may be a different configuration that is performed in advance. Further, when the terminal 12 is instructed to transmit new data on the second channel, a communication connection to the first channel is maintained until buffer data on the first channel before channel handover is sent and received completely.

A specific process of switching the communication between the base station 11 and the terminal 12 from the first channel to the second channel is described above, and is not described herein again.

Optionally, the sending a handover command to the terminal through the first channel includes:

sending a channel handover command to the terminal by using a radio resource control message; or sending a channel handover command to the terminal by using a MAC CE; or sending a channel handover command to the terminal by using a physical layer message.

Therefore, in this embodiment, the base station 11 and the terminal 12 in this embodiment may synchronously perform channel handover, which accelerates handover, maintains continuity of data transmission, and improves user experience; on the other hand, the base station 11 discretizes an occasion on which the terminal 12 establishes the connection to the base station 11 through a second channel, so that the terminal 12 randomly establishes the connection to the base station 11, which therefore can improve non-obstruction for the terminal 12 to establish a connection to the base station 11.

Figure 13:
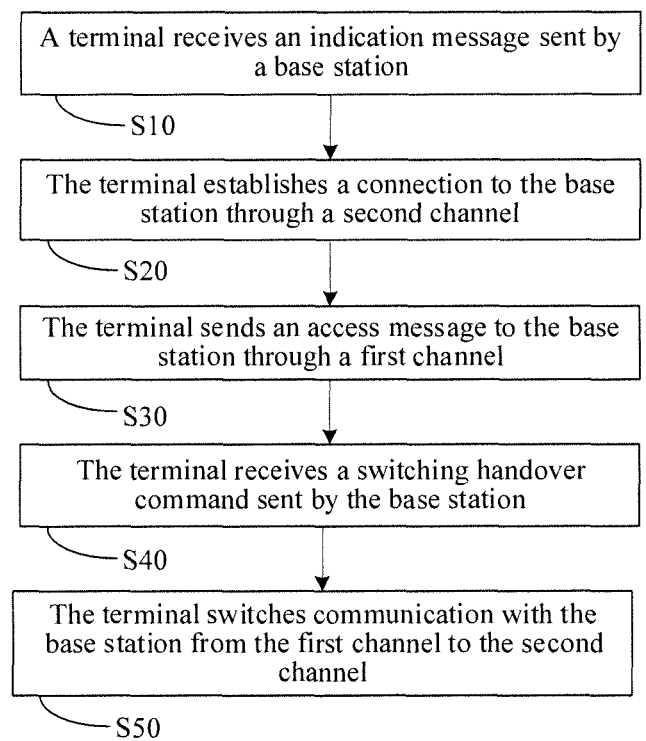
FIG. 13 is another flowchart of a handover method according to an embodiment of the present invention.

Referring to FIG. 13, FIG. 13 is a flowchart of a handover method provided based on the foregoing terminal 12 according to an embodiment of the present invention. The method includes the following steps:

S10: A terminal 12 receives an indication message sent by a base station 11, where the indication message is used to instruct the terminal 12 to further establish a connection to the base station 11 through a second channel in a case in which the terminal 12 maintains a connection to the base station 11 through a first channel, and the first channel and the second channel are on different frequencies.

S20: The terminal 12 establishes a connection to the base station 11 through the second channel.

S30: The terminal 12 sends an access message to the base station 11 through the first channel, where the access message indicates that the terminal 12 has established the connection to the base station 11 through the second channel.

S40: The terminal 12 receives a handover command sent by the base station 11, where the handover command instructs the base station 11 to switch the communication with the terminal 12 from the first channel to the second channel.

S50: The terminal 12 switches communication with the base station 11 from the first channel to the second channel.

Optionally, the indication message further includes a random access occasion parameter, and the random access occasion parameter is used to discretize an occasion on which the terminal randomly establishes the connection to the base station 11 through the second channel; therefore, step S20 further includes: establishing, by the terminal 12, a connection to the base station 11 through the second channel according to the occasion on which a connection to the base station 11 is randomly established. A specific process of randomly establishing a connection between the terminal 12 and the base station 11 is described above, and is not described herein again.

In another optional embodiment, the base station 11 may further instruct the terminal 12 to directly establish a connection to the base station 11 through the second channel.

Optionally, the handover command includes a channel handover time, and the channel handover time is used to indicate a time point at which the base station switches from the first channel to the second channel. For example, if the channel handover time is an SFN, the terminal 12 performs channel handover on a boundary of the SFN. The handover module 113 also performs channel handover on the boundary of the SFN, to ensure that handover by the handover module 113 is synchronous with handover by the terminal 12.

Optionally, the handover command further includes a channel configuration, and the channel configuration indicates a configuration used when the terminal 12 performs data transmission through the second channel. There are two types of channel configurations:

A first channel configuration is: the channel configuration instructs the terminal 12 to communicate with the base station 11 on the second channel by using a same configuration as that of the first channel.

Specifically, the frequency of the first channel needs to be completely aligned with the frequency of the second channel in a time domain, for example, a boundary of an SFN of the first channel is completely aligned with a boundary of an SFN of the second channel. Bandwidths of frequency resources of the first channel and the second channel remain unchanged, center frequencies of the first channel and the second channel deviate by a relative value, and the relative value is a difference between the frequencies of the first channel and the second channel. For example, a configuration of MAC, and buffer data and a configuration of an HARQ remain unchanged; an ACK/NACK is still fed back in an original time domain, and a frequency at which the ACK/NACK is fed back is added to the difference from the frequency of the first channel.

A second channel configuration is: the channel configuration instructs the terminal 12 to keep the first channel enabled until buffer data on the first channel is sent and received completely, and to communicate with the base station 11 on the second channel by using a different configuration from that of the first channel.

Specifically, the frequency of the first channel needs to be completely aligned with the frequency of the second channel in a time domain, for example, a boundary of an SFN of the first channel is completely aligned with a boundary of an SFN of the second channel. The terminal 12 uses the different configuration from that of the first channel on the second channel. The foregoing configuration includes at least one of the following information: an information frequency, a bandwidth, a physical layer, a MAC layer configuration, or the like. The foregoing configuration may be a default configuration, or may be a different configuration that is performed in advance. Further, when the terminal 12 is instructed to transmit new data on the second channel, a communication connection to the first channel is maintained until buffer data on the first channel before channel handover is sent and received completely.

A process of synchronously switching the communication between the terminal 12 and the base station 11 from the first channel to the second channel according to the channel handover time and the channel configuration is specifically described above, and is not described herein again.

To sum up, in the embodiments of the present invention, the base station 11 and the terminal 12 may synchronously perform channel handover, which accelerates handover, maintains continuity of data transmission, and improves user experience; on the other hand, the base station 11 discretizes an occasion on which the terminal 12 establishes a connection to the base station 11 through a second channel, so that the terminal 12 randomly establishes a connection to the base station 11, which therefore can improve non-obstruction for the terminal 12 to establish a connection to the base station 11.

The foregoing descriptions are merely embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

What is claimed is:

1. A base station, comprising:
   a memory configured to store a program including instructions; and
   a processor coupled to the memory and configured to execute the instructions to perform:
   sending an indication message to a terminal through the network interface, wherein the indication message is used to instruct the terminal to further establish a connection to the base station through a second channel in a case in which the terminal maintains a connection to the base station through a first channel, and the first channel and the second channel are on different frequencies;
   receiving, through the first channel, an access message sent by the terminal, wherein the access message indicates that the terminal has established the connection to the base station through the second channel;
   sending a handover command to the terminal through the network interface, wherein the handover command instructs the terminal to switch the communication with the base station from the first channel to the second channel, wherein
      the handover command comprises a channel configuration to indicate a configuration used when the terminal performs data transmission through the second channel,
      the channel configuration instructs the terminal to communicate with the base station on the second channel by using a same configuration as that of the first channel, and
      the same configuration refers to that bandwidths of frequency resources of the first channel and the second channel remain unchanged, and that center frequencies of the first channel and the second channel deviate by a relative value, and the relative value is a difference between the frequencies of the first channel and the second channel; and switching the communication with the terminal from the first channel to the second channel.

2. The base station according to claim 1, wherein the indication message further comprises a random access occasion parameter, and the program further performs the following step:
discretizing, by using the random access occasion parameter, an occasion on which the terminal randomly establishes the connection to the base station through the second channel.

3. The base station according to claim 1, wherein the handover command further comprises a channel handover time, and the channel handover time is used to indicate a time point at which the terminal switches from the first channel to the second channel.

4. The base station according to claim 1, wherein the channel configuration instructs the terminal to keep the first channel enabled until buffer data on the first channel is sent and received completely, and to communicate with the base station on the second channel by using a different configuration from that of the first channel.

5. A terminal, comprising:
a memory configured to store a program including instructions; and
a processor coupled to the memory and configured to execute the instructions to perform:
receiving, through the network interface, an indication message sent by a base station, wherein the indication message is used to instruct the terminal to further establish a connection to the base station through a second channel in a case in which the terminal maintains a connection to the base station through a first channel, and the first channel and the second channel are on different frequencies;
establishing the connection to the base station through the second channel;
sending an access message to the base station through the first channel, wherein the access message indicates that the terminal has established the connection to the base station through the second channel;
further receiving, through the network interface, a handover command sent by the base station, wherein the handover command instructs the terminal to switch the communication with the base station from the first channel to the second channel, wherein
the handover command comprises a channel configuration, and the channel configuration indicates a configuration used when the terminal performs data transmission through the second channel,
the channel configuration instructs the terminal to communicate with the base station on the second channel by using a same configuration as that of the first channel, and
the same configuration refers to that bandwidths of frequency resources of the first channel and the second channel remain unchanged, and that center frequencies of the first channel and the second channel deviate by a relative value, and the relative value is a difference between the frequencies of the first channel and the second channel; and
switching the communication with the base station from the first channel to the second channel.

6. The terminal according to claim 5, wherein the indication message further comprises a random access occasion parameter, the random access occasion parameter is used to discretize an occasion on which the terminal randomly establishes the connection to the base station through the second channel, and the program further performs the following step:
establishing the connection to the base station through the second channel according to the occasion on which the connection to the base station is randomly established.

7. The terminal according to claim 5, wherein the handover command further comprises a channel handover time, and the channel handover time is used to indicate a time point at which the terminal switches from the first channel to the second channel.

8. The terminal according to claim 5, wherein the channel configuration instructs the terminal to keep the first channel enabled until buffer data on the first channel is sent and received completely, and to communicate with the base station on the second channel by using a different configuration from that of the first channel.

9. A handover method, comprising:
sending, by a base station, an indication message to a terminal, wherein the indication message is used to instruct the terminal to further establish a connection to the base station through a second channel in a case in which the terminal maintains a connection to the base station through a first channel, and the first channel and the second channel are on different frequencies;
receiving, by the base station through the first channel, an access message sent by the terminal, wherein the access message indicates that the terminal has established the connection to the base station through the second channel;
sending, by the base station, a handover command to the terminal, wherein the handover command instructs the terminal to switch the communication with the base station from the first channel to the second channel, wherein
the handover command further comprises a channel configuration, and the channel configuration indicates a configuration used when the terminal performs data transmission through the second channel,
the channel configuration instructs the terminal to communicate with the base station on the second channel by using a same configuration as that of the first channel, and
the same configuration refers to that bandwidths of frequency resources of the first channel and the second channel remain unchanged, and that center frequencies of the first channel and the second channel deviate by a relative value, and the relative value is a difference between the frequencies of the first channel and the second channel; and
switching, by the base station, communication with the terminal from the first channel to the second channel.

10. The method according to claim 9, wherein the base station comprises a primary cell and a secondary cell, and the secondary cell comprises the first channel and the second channel;
the sending, by the base station, the indication message to the terminal comprises:
sending, by the base station, the indication message to the terminal through the first channel or the primary cell; and
the sending, by the base station, the handover command to the terminal further comprises:
sending, by the base station, the handover command to the terminal through the first channel or the primary cell.

11. The method according to claim 10, wherein the indication message further comprises a random access occasion parameter, and the random access occasion parameter is used to discretize an occasion on which the terminal randomly establishes the connection to the base station through the second channel.

12. The method according to claim 10, wherein the handover command further comprises a channel handover time, and the channel handover time is used to indicate a time point at which the terminal switches from the first channel to the second channel.

13. The method according to claim 9, wherein the channel configuration instructs the terminal to keep the first channel enabled until buffer data on the first channel is sent and received completely, and to communicate with the base station on the second channel by using a different configuration from that of the first channel.

* * * * *